United States Patent [19]

Chu et al.

[11] Patent Number: 4,558,899
[45] Date of Patent: Dec. 17, 1985

[54] COLLAPSIBLE VISOR

[75] Inventors: Zooey C. Chu, Holland; Ronald A. Dykstra, Rockford, both of Mich.

[73] Assignee: Prince Corporation, Holland, Mich.

[21] Appl. No.: 593,512

[22] Filed: Mar. 26, 1984

[51] Int. Cl.$^4$ .................................................. B60J 3/00
[52] U.S. Cl. ............................ 296/97 G; 160/DIG. 3
[58] Field of Search ............... 296/97 G, 97 K, 97 R; 160/DIG. 3

[56] References Cited

U.S. PATENT DOCUMENTS

| | | | |
|---|---|---|---|
| 1,583,860 | 5/1926 | Simmons | 296/97 G |
| 1,925,123 | 9/1933 | Vincent | 296/97 R |
| 1,957,847 | 5/1934 | Peters | 296/97 G |
| 1,990,413 | 2/1935 | Michaelis | 296/97 G |
| 2,029,534 | 2/1936 | Knapp | 296/95 |
| 2,070,208 | 2/1937 | Kelly | 296/97 G |
| 2,118,198 | 5/1938 | Hathaway | 296/97 G |
| 2,231,641 | 2/1941 | Schwab | 296/97 G |
| 2,345,106 | 3/1944 | Erps | 296/97 G |
| 2,492,074 | 12/1949 | Thompson | 296/97 G |
| 2,528,038 | 10/1950 | Crise | 296/97 G |
| 2,842,395 | 7/1958 | Davis | 296/97 G |
| 3,369,838 | 2/1968 | Nelson | 296/97 G |

FOREIGN PATENT DOCUMENTS 307145 3/1929 United Kingdom ............. 296/97 G

Primary Examiner—Robert R. Song
Attorney, Agent, or Firm—Price, Heneveld, Huizenga & Cooper

[57] ABSTRACT

A collapsible visor is made of a flexible visor panel supported on a frame. In one embodiment, the flexible panel includes a plurality of interconnected panels which fold on one another in an accordion-like fashion for collapsing the visor into a housing mounted within a vehicle headliner. Guide and support means couple the flexible visor panel to the frame for supporting the flexible panel in its movement between a retracted stored position and an extended use position.

14 Claims, 8 Drawing Figures

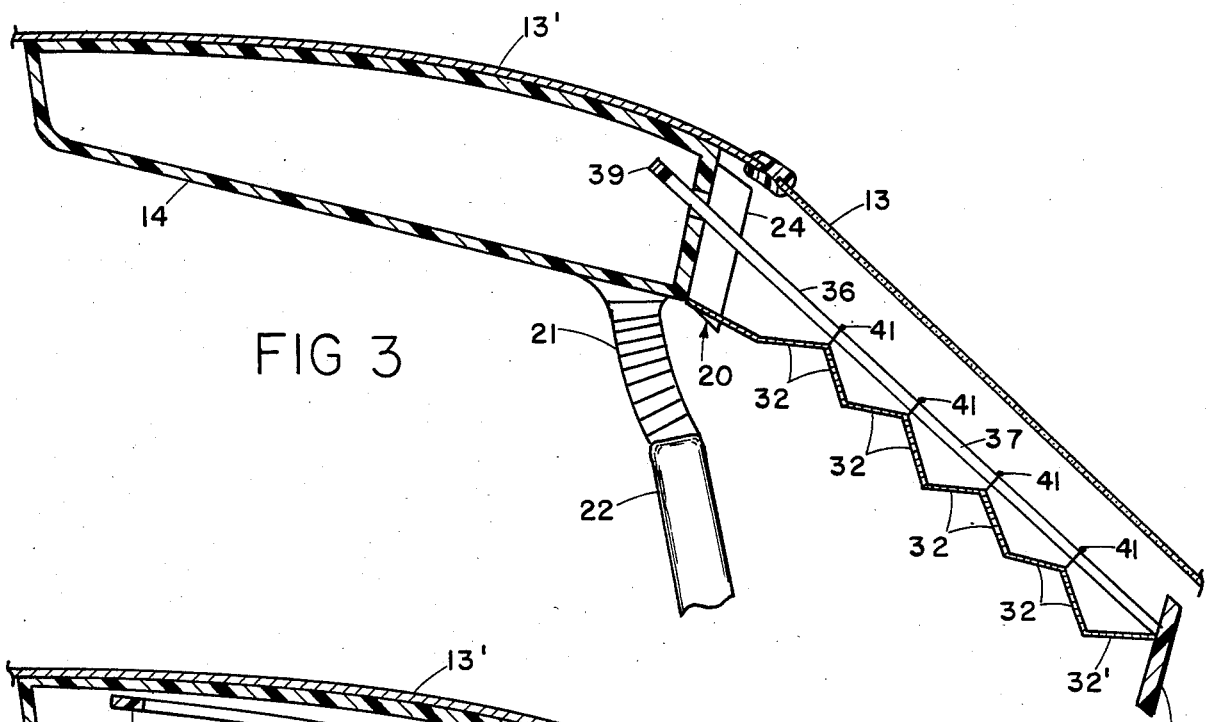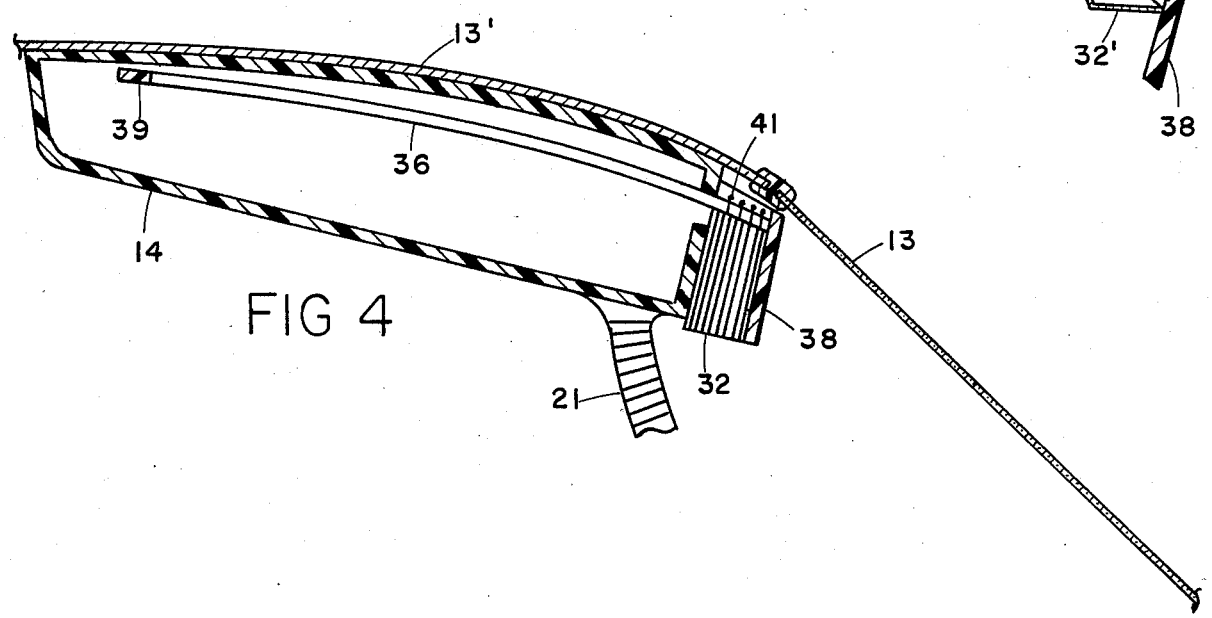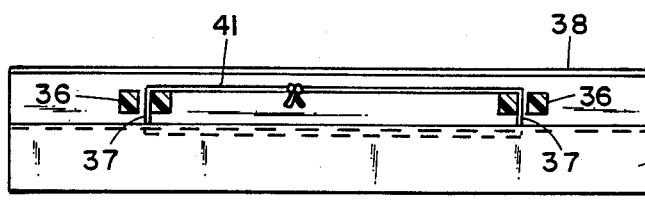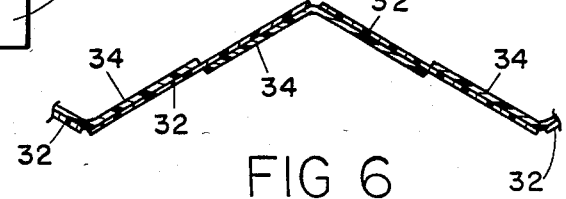

COLLAPSIBLE VISOR

BACKGROUND OF THE INVENTION

The present invention pertains to vehicle visors, and particularly to a visor which collapses for storage and extends for use.

With modern vehicle design and particularly with attention now being paid to detail in interior design, visor construction and storage in vehicles is becoming an increasingly difficult problem to solve. Typically, visors are large planar blades or panels of light opaque or translucent material which are pivoted by pivot mechanisms between lowered use positions and raised stored positions adjacent the headliner, or in some cases, recessed within a pocket formed in the vehicle headliner or roof area. As windshields become more streamlined and raked rearwardly, the headliner/windshield interface tends to move rearwardly, and in some vehicles, such conventional sun visors are not practical. As the thickness of the headliner diminishes, concealed visors, such as disclosed in U.S. patent application Ser. No. 403,567, entitled CONCEALED VISOR and filed on July 30, 1982 also become more difficult to implement.

In order to accommodate storage of relatively large visors, visors can be divided into separate interconnected panels, and the prior art is replete with examples of such construction. See, for example, U.S. Pat. Nos. 2,345,106; 1,957,847; 1,925,123; 1,990,413; 2,029,534; 2,070,208; 2,118,198; 2,231,641; 2,492,074; 2,528,038; 2,842,395; 3,369,838; and Great Britain Pat. No. 307,145. This prior art discloses visor construction which is of a size considered unwiedly and unsafe for modern vehicles. Although providing interesting historical visor designs in antique vehicles, such construction has no relevance or application to present day modern visor design with increasing emphasis on interior design functionality and appearance.

SUMMARY OF THE PRESENT INVENTION

The visor system of the present invention provides a concealed, collapsible visor made of a flexible visor panel supported on a frame. In one embodiment, the flexible panel includes a plurality of interconnected panels which fold on one another in an accordion-like fashion for collapsing the visor into a housing mounted within a vehicle headliner. Guide and support means couple the flexible visor panel to the frame for supporting the flexible panel in its movement between a retracted stored position and an extended use position.

In some embodiments, the frame may extend along the edges of the visor panel with interconnecting guide means provided. In other embodiments, the frame means may have sides spaced inwardly from the edges of the panel with coupling means coupling the panel to the frame.

Such visor construction can be employed as an auxiliary visor for filling in the area above a central rearview mirror or as a primary visor for the driver or passenger sides of the vehicle.

This visor construction permits relatively compact concealed storage of a fairly large visor panel in a small area and yet provides a functional and easy to use visor.

These and other features, objects and advantages of the present invention will become apparent upon reading the following description thereof together with reference to the accompanying drawings in which:

BRIEF DESCRIPTION OF THE DRAWINGS

FIG. 3 is a vertical, corss-sectional view of the visor shown in FIG. 1;

FIG. 4 is a vertical, cross-sectional view of the visor shown in FIG. 1 but shown in a retracted, stored position;

FIG. 5 is a cross-sectional view taken along section line V—V of FIG. 2;

FIG. 6 is an enlarged, fragmentary, cross-sectional view taken along section line VI—VI of FIG. 2;

DETAILED DESCRIPTION OF THE PREFERRED EMBODIMENTS

Figure 1:
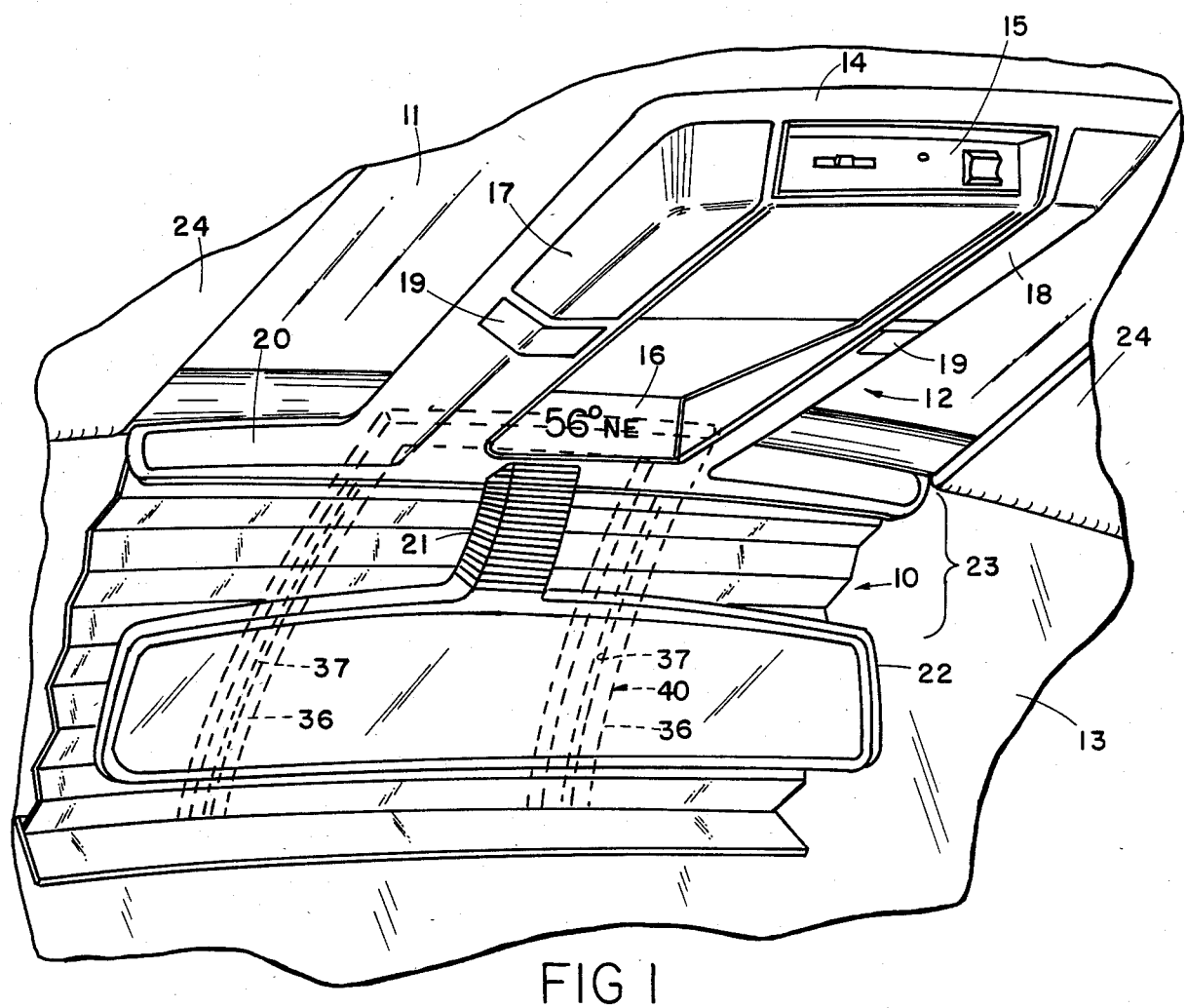
FIG. 1 is a fragmentary, perspective view of one embodiment of the present invention shown installed in a vehicle.

Referring initially to FIG. 1, there is shown a visor 10 embodying the present invention and which is incorporated in an overhead console 12 positioned centrally within the vehicle and mounted to the roof 11 of the vehicle immediately adjacent the windshield 13. Console 12 includes a housing 14 into which there is installed a removable garage door opening transmitter assembly 15, a digital compass and temperature display assembly 16 and a pair of map or courtesy lamps 17 and 18, actuated by push-button switches 19. The housing, including the garage door opening assembly and compass system, is disclosed in greater detail in U.S. patent application, Ser. No. 478,364, entitled ELECTRICAL CONTROL SYSTEM, filed on Mar. 24, 1983, the disclosure of which is incorporated herein by reference. Along the forward edge of housing 14 is a visor housing 20 for storably receiving the visor 10 when in a collapsed position. The console 12 also includes means for attaching the post 21 of a rearview mirror assembly 22 as shown.

The visor assembly 10, as seen in FIG. 1 in the first embodiment of the invention, is a relatively small, auxiliary visor specifically designed to extend behind and fill in the gap 23 above the rearview mirror remaining when conventional, rectangular visors 24 are employed. The construction of visor 10 is best seen by reference to FIGS. 2-6, now described in detail.

Figure 2:
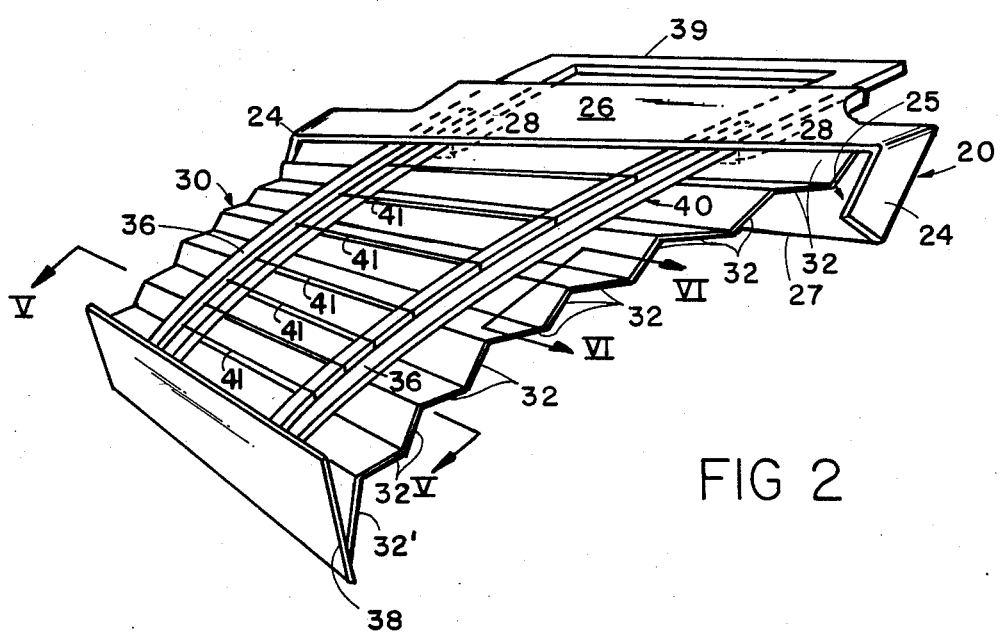
FIG. 2 is a perspective view of the visor shown in FIG. 1 taken from the opposite side.

Visor 10 is composed of a flexible visor panel 30 movably supported with respect to a generally rectangular frame 40 in turn movably supported by housing 20 which is shaped to be mounted to the vehicle. Visor panel 30, in the first embodiment, comprises a plurality of elongated, rectangular slats 32, each hingedly coupled to an adjacent slat to provide an accordion-like fold as the visor is moved from an extended position, illustrated in FIGS. 1, 2 and 3, to a stored position within housing 20 (FIG. 4). The preferred structure for hingedly coupling adjacent slats or panel sections comprises attaching the slats in parallel, adjacent relationship by alternately staggered strips of tape 34, as seen in FIG. 6. By staggering the strips of tape 34 on opposite sides of the panel sections 32, smooth accordion folding of the rigid panels 32 is achieved. Panels 32 and tape or adhesively backed fabric 34 are of a uniform color such as black to provide a continuous light blocking surface facing the driver. The parallel, adjacent panels 32 provide structured collapsing of the visor and are movably supported by the frame 40. The generally rectangular frame 40 includes a pair of slotted support arms 36 spaced inwardly from opposite sides of the visor panel 30. The frame also includes a decorative end strip 38 at one end and a cross member 39 at an opposite end. Guides 36 include longitudinally extending slots 37 therein permitting connecting means such as a nylon cord 41 to extend through the visor panel 30, through slots 37 and along the backside of the visor panel at each of the junctions of the panels 32 for providing guiding and support means at spaced locations along the composite visor panel 30. Thus, as the visor is moved from an extended position, as shown in FIGS. 1–3, to a collapsed position, shown in FIG. 4, the loops of cord 41 slide along arms 36 within slots 37 to support the visor, adjacent frame members 36, to prevent the otherwise flexible and collapsible visor panel 30 from bowing outwardly when installed in a vehicle.

The housing 20 includes a pair of sidewalls 24 (FIG. 2) extending downwardly from a top wall 26. A rear wall 27 includes slots 28 through which arms 36 slidably and guidably extend. Naturally, the frame arms 36 are extended through housing 20 prior to the addition of panel 38. End member 38 serves as a handle and cover which extends flush within opening 25 of housing 20 when the visor is retracted to provide a neat appearance for the visor installation. By gripping end panel 38 and pulling downwardly, the visor extends, as illustrated in FIG. 1, to a sun blocking position, filling the gap 23 between the top of the rearview mirror and the interface between the headliner and windshield. The arms 36 and cross member 39 are made of a flexible, resilient polymeric material, such as polyvinyl chloride, to permit the arms to bend and flex as they are extended to a visor closed position within housings 20 and 14 of the vehicle, as seen in FIG. 4. If necessary, a suitable guide track can be provided for arms 36 to assure smooth operation in their movement between a retracted and extended position.

Although the visor illustrated in FIGS. 1–6 is shown as a relatively small, auxiliary visor, its size can be enlarged for use as a passenger or driver visor centered in front of the passenger or driver seats, respectively, by increasing the size of the visor and by adding one or more additional guide and support arms to the frame as required.

Figure 7:
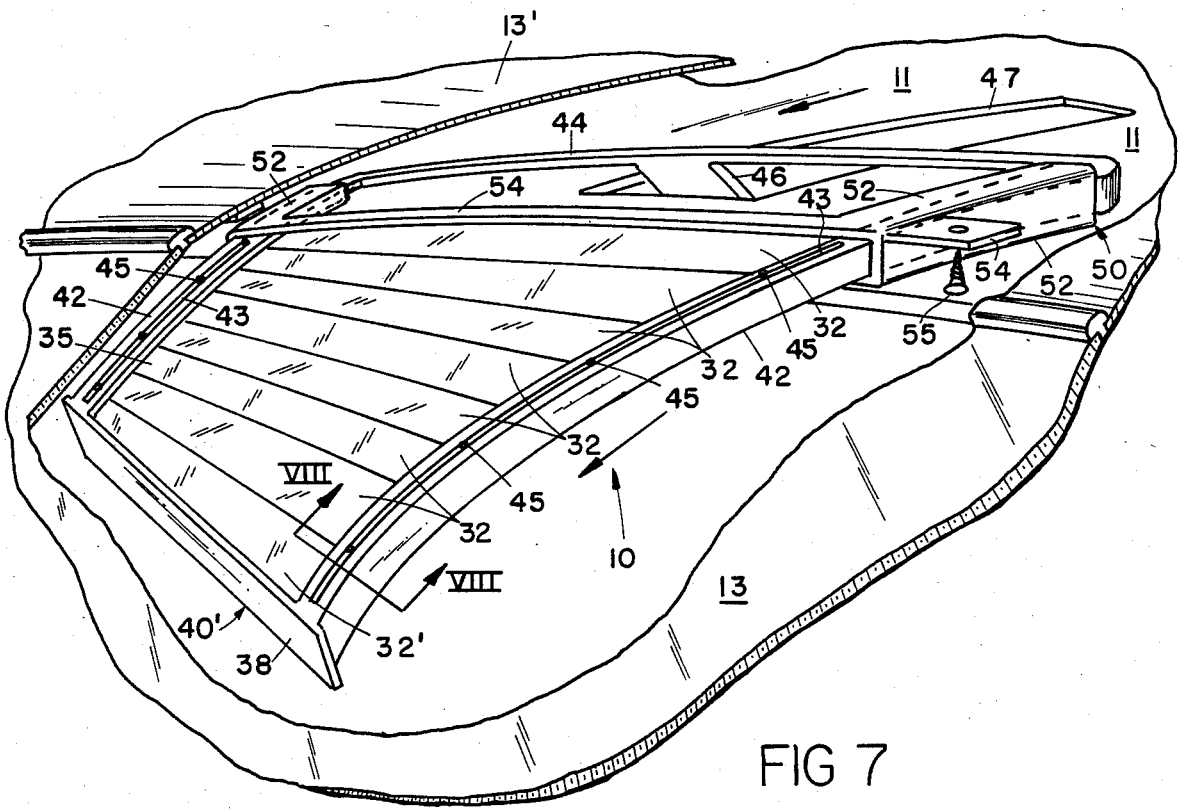
FIG. 7 is a fragmentary, perspective view of an alternative embodiment of the present invention.
Figure 8:
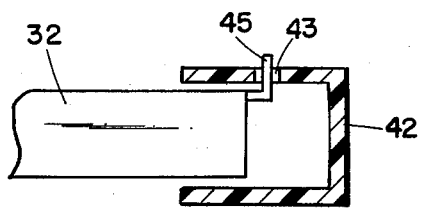
FIG. 8 is an enlarged, fragmentary, cross-sectional view taken along section line VIII—VIII of FIG. 7.

In an alternative embodiment shown in FIGS. 7 and 8, the similarly constructed elements are identified with identical reference numbers. In FIG. 7, the visor is viewed from outside of the vehicle looking downwardly through the windshield 13 and roof 13'. The visor panel 30 is substantially the same as that shown in the first embodiment and is made of a plurality of hingedly coupled, elongated, rectangular panels 32. As with the first embodiment, the endmost panel 32' is hingedly joined to the end panel 38 of the frame. The frame 40' includes U-shaped channels 42 into which the ends of panels 32 extend slightly. Each of the channels 42 are somewhat arcuate, as seen in FIG. 7, such that they conform to the curvature of the windshield and roof. Each channel 42 includes a slot 43 along the top surface for receiving guide pins 45 which are generally L-shaped having one leg coupled to the ends of panels 32 and the remaining leg extending outwardly and upwardly through slot 43 for guidably supporting the opposite ends of panels 32 within channels 42. Channels 42 extend upwardly through a housing assembly 50 and terminate in a cross member 44 including a handle 46 which extends through a slot 47 in the headliner 11 permitting the user to move the handle 46 and thus move the frame constituting end members 38 and 44 and side guides 42 between an extended position, as shown, with handle 46 moved forwardly in the vehicle and a retracted position with handle 46 moved toward the opposite end of slot 47. Housing 50 includes a pair of U-shaped side channels 52 for slidably receiving channels 42 and a cross support 54. Tabs 54 are provided at opposite sides of channels 52 for securing housing 50 and hence the visor assembly mounted therein to the sheet metal roof of a vehicle by means of fastening screws 55.

The visor assembly 10 so formed is installed in a vehicle during initial manufacturing and suitable bosses are provided for receiving the sheet metal screws 55. The headliner panel 11 includes the fore and aft extending slots 47 permitting extension of the control handle 46 therethrough. The dimensions of channels 42 and 52 are selected such that the frame 40' and visor panel 30 supported thereon move relatively easily with respect to housing 50 but have sufficient frictional contact to hold the resultant visor in any desired extended position or in the fully stored position. Naturally, if desired, suitable additional locking means can be provided for releasably locking the visor in a desired, adjusted position. Channels 42 and frame 50 are made of a suitable polymeric material having a somewhat lubricious surface to facilitate movement of the visor between an extended use position, as illustrated in FIG. 7, and a collapsed, retracted position within housing 50.

It will become apparent to those skilled in the art that various modifications to the preferred embodiments of the invention can be made without departing from the spirit or scope of the invention as defined by the appended claims.

The embodiments of the invention in which an exclusive property or privilege is claimed are defined as follows:

1. A visor for a vehicle comprising:
   a visor frame including a pair of generally parallel spaced guide arms;
   a flexible visor panel supported by said guide arms in movable relationship thereto; and
   housing means for movably mounting said frame to a vehicle for supporting said frame between a retracted position with said flexible panel in a collapsed position and an extended position in which said panel is opened for use of the visor, said housing including means for guidably receiving and supporting said guide arms of said frame.

2. The apparatus as defined in claim 1 wherein said visor panel includes a plurality of flexibly interconnected rigid sections.

3. The apparatus as defined in claim 2 wherein each section of said visor panel comprises an elongated, rectangular panel and hinge means coupling adjacent panels.

4. The apparatus as defined in claim 3 wherein said hinge means comprises a layer of flexible material adhesively bonded to said panels.

5. A visor for a vehicle comprising:
   a visor frame;

a flexible visor panel supported by said frame, said visor panel including a plurality of flexibly interconnected rigid sections wherein each section of said visor panel comprises an elongated rectangular panel and hinge means coupling adjacent panels and said hinge means comprises a layer of flexible material adhesively bonded to said panels; and means for movably mounting said frame to a vehicle for supporting said frame between a retracted position with said flexible panel in a collapsed position and an extended position in which said panel is opened for use of the visor, wherein said frame includes a pair of spaced sides including elongated slots and said visor includes means coupled to said visor panel and extending into said slots for movement therealong as said visor is moved between retracted and extended positions.

6. The apparatus as defined in claim 5 wherein said means for movably mounting said frame comprises a housing shaped to be mounted to a vehicle such that said frame retracts substantially within said housing when in said retracted position.

7. A hidden collapsible visor for a vehicle comprising:

a generally rectangular visor frame;

a collapsible visor panel;

means for movably supporting said panel with respect to said frame; and a housing for movably supporting said frame on a vehicle between a retracted position with said frame substantially within said housing and said visor panel in a collapsed position and an extended position in which said panel is opened; wherein said frame includes a pair of spaced sides including elongated slots and said supporting means are coupled to said visor panel and extend into said slots for movement therealong as said visor is moved between retracted and extended positions.

8. The apparatus as defined in claim 7 wherein said supporting means comprises cord means coupling said visor panel to said frame at spaced locations.

9. The apparatus as defined in claim 7 wherein said supporting means comprises guide pins extending from said visor panel at spaced locations.

10. The apparatus as defined in claim 7 wherein said visor panel includes a plurality of flexibly interconnected rigid sections.

11. The apparatus as defined in claim 10 wherein each section of said visor panel comprises an elongated, rectangular panel and hinge means coupling adjacent panels.

12. The apparatus as defined in claim 11 wherein said hinge means comprises a layer of flexible material adhesively bonded to said panels.

13. The apparatus as defined in claim 12 wherein said hinge means comprises alternately staggered strips of tape joining adjacent panel sections.

14. The apparatus as defined in claim 1, wherein said guide arms of said frame include elongated slots and said visor panel includes means extending into said slots for movement therealong as said visor is moved between retracted and extended positions.

* * * * *